Feb. 11, 1958 E. F. DUFFY 2,822,945
TRACTOR-TRAILER DRAWBAR COUPLINGS
Filed May 8, 1957 2 Sheets-Sheet 1
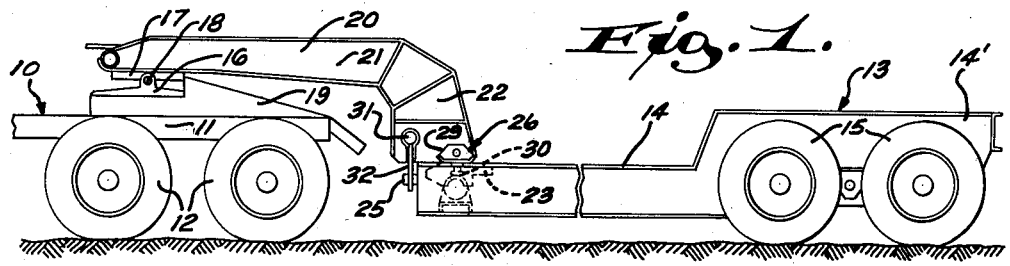
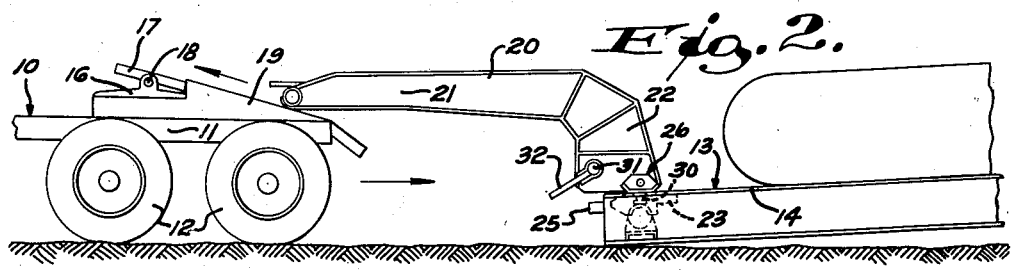
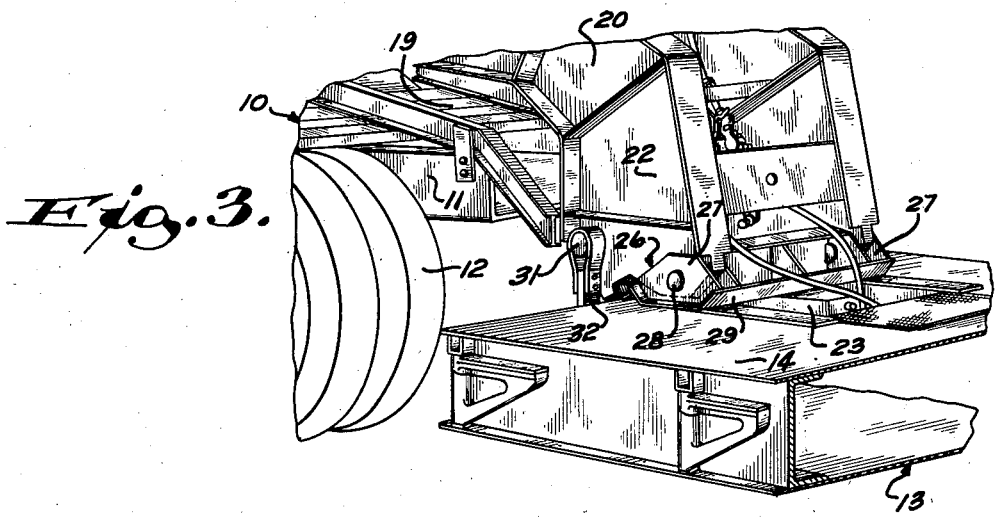
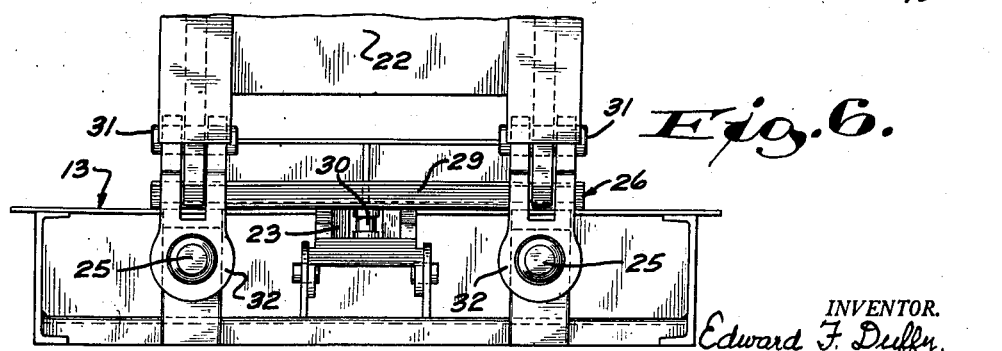
INVENTOR.
Edward F. Duffy,
BY Morsell & Morsell
ATTORNEYS

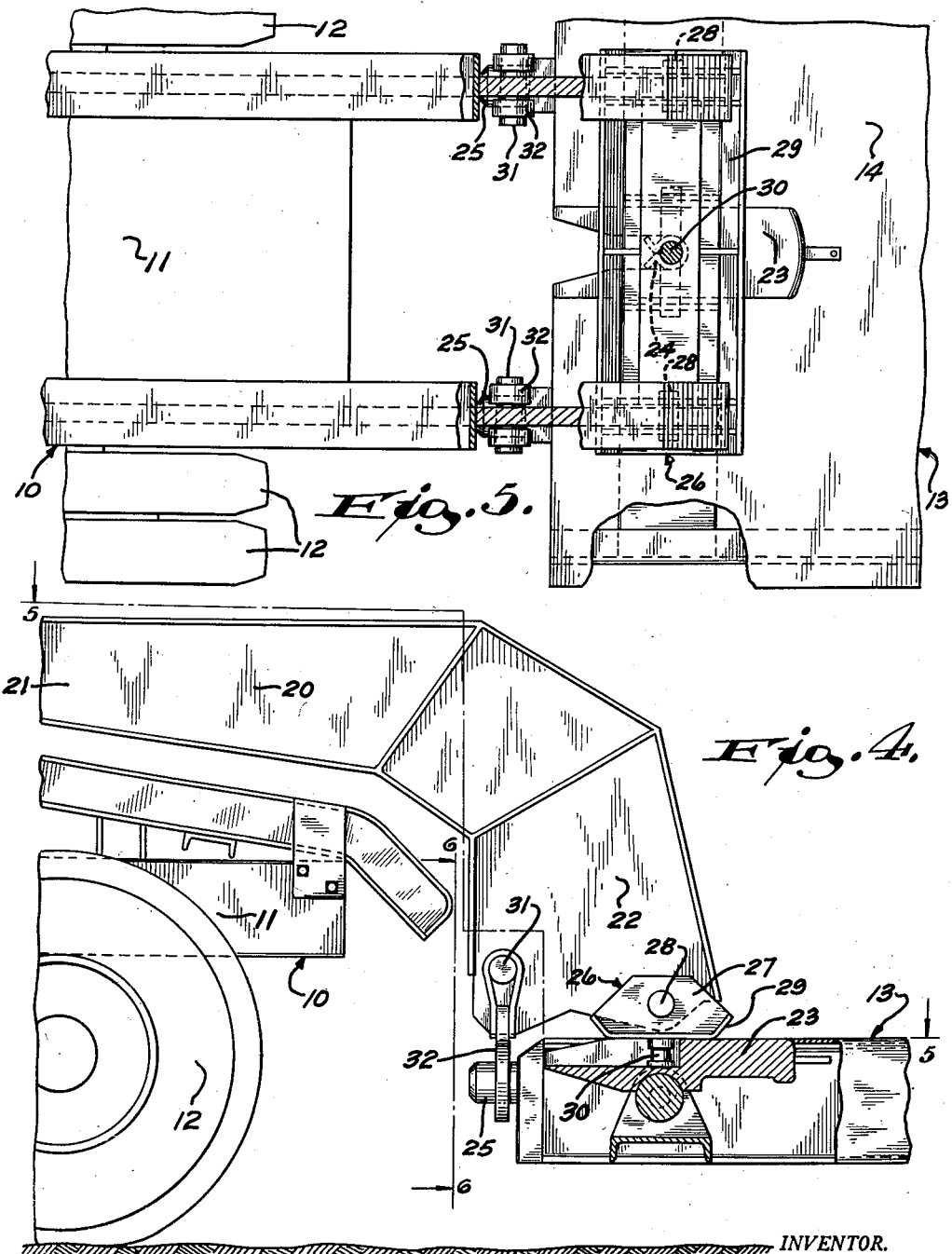

United States Patent Office 2,822,945
Patented Feb. 11, 1958

2,822,945
TRACTOR-TRAILER DRAWBAR COUPLINGS

Edward F. Duffy, La Crosse, Wis., assignor to La Crosse Trailer Corporation, La Crosse, Wis., a corporation of Wisconsin Application May 8, 1957, Serial No. 657,953

10 Claims. (Cl. 214—505)

This invention relates to improvements in tractor-trailer drawbar couplings, and more particularly to a locking and control mechanism for a detachable gooseneck drawbar for a tractor-trailer assemblage.

Tractor and trailer assemblages are in common usage and for certain types of hauling the semi-trailer is in the form of a low bed vehicle supported on rear wheels and carried at its forward end by a "gooseneck" type of drawbar, such low bed semi-trailers being especially suited for the convenient front end loading and unloading of heavy machinery. In assemblages of this type it is conventional to provide a connection between the front end of the trailer and the rear end of the drawbar whereby the drawbar may be completely disconnected from the trailer while remaining connected to the tractor so that the front end of the low bed trailer, after being lowered into contact with the ground or supporting surface, is unobstructed for loading and unloading. After the low bed trailer has been loaded or unloaded from its front, the tractor, carrying the gooseneck drawbar, may be backed into alignment with the front end of the trailer and have the drawbar coupled with the trailer. For lowering and raising the front end of the trailer with the drawbar coupled thereto, it is necessary to adjust the drawbar vertically and longitudinally with respect to the tractor, there being a disconnectable coupling as between the front end of the gooseneck drawbar and the tractor.

With the foregoing in mind, it is a primary object of the present invention to provide a tractor-trailer drawbar coupling whereby adjustment of the drawbar relative to the front end of the trailer may be readily accomplished in a manner to achieve quick and perfect alignment of the drawbar with the coupling means on the trailer, regardless of the inclination of the front end of the trailer.

A more specific object of the invention is to provide a tractor-trailer drawbar coupling in which the connection between the rear end of the gooseneck drawbar and the front end of the loaded or unloaded trailer may be easily and quickly effected by a single operator or attendant and which is registrable with any normal position of the front end of the trailer, whether it be horizontal or inclined to a ground or support engaging position.

A further more specific object of the invention is to provide in a tractor-trailer drawbar coupling assemblage, pivotal stirrup members carried by the rear end of the gooseneck drawbar for releasable engagement with horizontal dowels projecting forwardly from the front end of the trailer, together with a kingpin bearing plate pivotally carried by the rear end of the drawbar connectable with a complementary fifth wheel plate carried by the forward end of the trailer, the pivotal mounting of the kingpin bearing plate end and the angled formation of end portions thereof providing the same with an adjustable or compensatable angle of approach relative to the fifth wheel on the front end of the trailer.

A further object of the invention is to provide a tractor-trailer drawbar coupling wherein the forward end of the drawbar may be disengaged from the tractor and remain with its rear end in coupled relation to the trailer, the coupling being such that the rear end of the gooseneck drawbar is rigidly and stably engaged with and supported by the trailer.

A further object of the invention is to provide a tractor-trailer drawbar coupling which is of very simple construction, is easy and expeditious to operate, is safe to use, and is well adapted for the purposes described.

With the above and other objects in view the invention consists of the improved tractor-trailer drawbar coupling, and its parts and combinations as set forth in the claims, and all equivalents thereof.

In the accompanying drawings, in which the same reference characters indicate the same parts in all of the views, Fig. 1 is a fragmentary side elevational, semi-schematic view of a tractor-trailer assemblage provided with the improved gooseneck drawbar coupling with the latter shown engaged both with the tractor and elevated front end of the trailer in transportable conidtion;

Fig. 2 is a similarly fragmentary side elevational, semi-schematic view of the tractor-trailer assemblage with the front end of the trailer inclined onto the ground and showing the drawbar about to be disengaged from the trailer with the front end of the drawbar on an inclined ramp leading to the tractor fifth wheel, which position is attained either when the tractor is pulling away from the drawbar and trailer or backing into coupling position;

Fig. 3 is an enlarged fragmentary perspective view of the rear end of the tractor and gooseneck drawbar connected with the front end of the low bed trailer, parts being broken away and shown in section;

Fig. 4 is an enlarged fragmentary side view of the rear end portion of the tractor and forward end portion of the low bed trailer coupled to the gooseneck drawbar, parts being broken away and in section to show structural details;

Fig. 5 is a sectional view of the showing in Fig. 4 taken along the line 5—5 of Fig. 4; and Fig. 6 is a fragmentary, detail, vertical sectional view taken approximately along the line 6—6 of Fig. 4.

Although the improved drawbar coupling is illustrated and will be described in connection with a tractor and low bed semi-trailer assemblage, it should be understood that the invention has application to other types of vehicle trains. However, the vehicle train illustrated includes a conventional tractor 10 having a longitudinal main frame or chassis 11 supported on rear traction wheels 12. The forward portion of the tractor (not shown) may include a cab and front wheels. The trailer 13 is of the low bed type having a relatively long platform 14 including an upwardly arched rear portion 14' (see Fig. 1) carried on rear bogie wheels 15.

There is mounted on the rear end portion of the tractor 10 a conventional fifth wheel structure 16 in which a fifth wheel plate 17 is carried by a horizontal transverse pivot pin 18 whereby the fifth wheel plate 17 may tilt from its normal horizontal position of Fig. 1 to the inclined position of Fig. 2 in alignment with the surface of an inclined ramp 19. Thus, the front end of a gooseneck drawbar 20 which carries a conventional kingpin (not shown) for engagement with the tractor fifth wheel plate 17, may be engaged with the tractor fifth wheel assemblage, as in Fig. 1, or may be disengaged therefrom and slid down the ramp 19 when the tractor 10 is propelled forwardly, as in Fig. 2.

The gooseneck drawbar 20 previously referred to includes a horizontal forwardly extending portion 21 and a downwardly extending rear portion 22. The latter is releasably connectable to the front end of the trailer 13 by the improved coupling, which is in the nature of a locking and control mechanism, and which will hereinafter be described in detail. At this point it may be stated that the front end of the trailer 13, just below its top surface, is provided with a forwardly opening bifurcated standard fifth wheel 23 which at its closed end includes a kingpin spring locking device 24 shown in Fig. 5 but omitted, for the sake of clarity, from Fig. 4 and other views. There are also rigidly mounted on the front end of the trailer 13 a pair of forwardly projecting horizontal laterally spaced-apart dowels 25.

With particular reference to Figs. 3, 4, 5 and 6, it will be observed that the depending rear end portion 22 of the gooseneck drawbar 20 carries transversely a box-like kingpin bearing plate designated generally by the numeral 26. This box-like kingpin bearing plate has polygonal-shaped end plates 27 which are pivotally secured to the lower side walls of the drawbar end portion 22 by horizontal pivot studs 28. Said polygonal end plates 27 rigidly carry on their lower edge portions a transverse runner plate 29 which extends transversely across the bottom of the drawbar portion 22 and which has an intermediate flat portion and upwardly angled front and rear edges. The pivotal mounting of the kingpin bearing plate box structure 26 together with the inclined front and rear edges thereof adapt it to any angle of approach of the rear end of the drawbar relative to the front end of the trailer 13 and facilitates smooth movement of the end of the drawbar onto or away from the surface of the front end of the trailer whether the latter be in a horizontal position, or whether it be inclined as in Fig. 2. Secured to and depending from an intermediate portion of the horizontal bottom portion of the runner plate 29 is a kingpin 30. This kingpin 30 is adapted to engage the bifurcated portion of the fifth wheel 23 formed in the front end of the trailer 13 when the drawbar is properly engaged with and connected to the trailer as in the drawings.

Opposite sides of the down-turned end portion 22 of the drawbar 20 toward the front, and in registration with the trailer-carried dowels 25, are provided with transverse horizontal pivot studs 31 on each of which is pivotally mounted the bifurcated arms of a stirrup 32, said stirrups being arranged to swing fore and aft in a vertical plane to engage and disengage the same with the trailer-carried dowels 25 regardless of the inclination of said dowels.

Fig. 1 illustrates the gooseneck drawbar connected both to the tractor and to the trailer in which condition the tractor-trailer train is arranged for transportation and carrying its load. At a point of destination where the trailer load is to be removed from the front end of the trailer or where the trailer is to be provided with a load, as shown on the trailer platform in Fig. 2, the front end of the drawbar 20 is first released from the tractor fifth wheel plate 17 and the tractor is moved forwardly slightly, permitting the released front end of the drawbar 20 to slide down the tractor ramp 19 until the front end of the trailer 13 engages the ground or other supporting surface. At this point the single attendant will then swing the stirrups 22 upwardly away from the trailer-carried dowels 25 in the manner shown in Fig. 2. Thereafter the tractor may be backed up slightly to ride the forward end of the gooseneck upwardly on the tractor ramp 19 and to engage the front end of the drawbar with the tractor fifth wheel assemblage 16. Due to the lowered position of the front end of the trailer there may be some clearance between portions of the tractor ramp 19 and the undersurface of the drawbar horizontal arm portion 21 and a transverse block of proper thickness may be slipped in between these two elements. With the front end of the drawbar thus re-engaged with the tractor, the tractor is propelled forwardly away from the front end of the trailer with the drawbar kingpin 30 then moving free of the trailer fifth wheel plate 23. Thus the tractor may be loaded or unloaded from its front end. To re-engage the rear end of the drawbar 20 with the lowered front end of the trailer, a reverse operation of the tractor carrying the drawbar is performed to first engage the drawbar kingpin 30 with the trailer fifth wheel plate 23, followed by a forward propulsion of the tractor and a release of the front end of the drawbar from the tractor fifth wheel assemblage to the position of Fig. 2, following which the drawbar-carried stirrups 32 are swung down over the trailer-carried dowels 25. Thereupon a slight rearward movement of the tractor will cause the front end of the drawbar to ride up on the ramp 19 and to re-engage the tractor fifth wheel assemblage and in so doing the front end of the trailer engaged by the drawbar is then elevated, with the ultimate attainment of the drawbar-engaged and transportable condition of the assemblage shown in Fig. 1. In performing these operations, it is obvious that the kingpin bearing plate box structure 27 may rock on its pivotal mountings 28 so that the inclined end portions of the bottom member 29 of the kingpin bearing plate structure will smoothly and freely engage the top surface of the front end of the trailer and conform to its inclination. The kingpin 30 will thus be easily guided into or out of the trailer fifth wheel member and the additional connection or disconnection afforded by the pivotal stirrups 32 is easily manually accomplished by a single operation.

It is, of course, obvious that the rear end of the drawbar may be left coupled to the front end of the trailer with the front end of the drawbar disengaged from the tractor fifth wheel assemblage, in which case the tractor may be driven away devoid of the drawbar. Under these conditions the coupling between the rear end of the drawbar and the front end of the trailer will very rigidly and stably support the drawbar.

From the foregoing description it will be apparent that the improved tractor-trailer drawbar coupling mechanism is simple, but nevertheless affords perfect registration as between the coupling elements on the drawbar and the coupling elements on the trailer regardless of the position of the front end of the trailer. The engagement and disengagement as between the drawbar and trailer can be easily and accurately effected with the oscillatable kingpin bearing plate assemblage providing for tolerances in respect to angularity. The coupling mechanism is simple, safe, easily and quickly operatable, and is otherwise well adapted for the purposes described.

What is claimed as the invention is:

1. In a tractor-low bed trailer assemblage, connecting means interposed therebetween comprising, a detachable gooseneck drawbar for removable connection with complementary connecting means on the tractor, the front end portion of the low bed trailer being provided with a fifth wheel and a forwardly projecting horizontal dowel, the lower rear end portion of the gooseneck drawbar having pivotally mounted thereon for swinging movement in a vertical plane a hooking element to engage the trailer-carried dowel, said lower rear end portion of the gooseneck drawbar also having pivotally mounted thereon a bearing plate assemblage with a kingpin depending therefrom which is engageable with the trailer-carried fifth wheel.

2. In a tractor-low bed trailer assemblage wherein the forward end portion of the trailer carries a fifth wheel, connecting means interposed therebetween comprising, a detachable gooseneck drawbar for removable connection with a tractor-carried fifth wheel plate, the front end portion of the low bed trailer being provided with a fifth wheel and a forwardly projecting horizontal dowel, a hook member vertically swingably carried by the lower rear end portion of the gooseneck drawbar for releasable engagement with the trailer-carried dowel, a box-like bearing plate member vertically swingably carried by the lower rear end portion of the gooseneck drawbar for engagement with the forward surface of the trailer in horizontal or inclined position; and a kingpin depending from the bearing plate member engageable with the trailer-carried fifth wheel.

3. In a tractor-low bed trailer assemblage wherein the forward end portion of the trailer carries a fifth wheel, connecting means interposed therebetween comprising, a detachable gooseneck drawbar for removable connection with a tractor-carried fifth wheel plate, the front end portion of the low bed trailer being provided with a fifth wheel and a pair of forwardly projecting laterally spaced-apart dowels, a pair of laterally spaced-apart hook members vertically swingably carried by the lower rear end portion of the gooseneck drawbar for releasable engagement with the trailer-carried dowels, a box-like bearing plate member vertically swingably carried by the lower rear end portion of the gooseneck drawbar for engagement with the forward surface of the trailer in horizontal or inclined position; and a kingpin depending from the bearing plate member engageable with the trailer-carried fifth wheel.

4. In a tractor-low bed trailer assemblage wherein the forward end portion of the trailer carries a fifth wheel, connecting means interposed therebetween comprising, a detachable gooseneck drawbar for removable connection with a tractor-carried fifth wheel plate, the front end portion of the low bed trailer being provided with a fifth wheel and a forwardly projecting dowel, a hook member vertically swingably carried by the lower rear end portion of the gooseneck drawbar for releasable engagement with the trailer-carried dowel, a box-like bearing plate member vertically swingably carried by the lower rear end portion of the gooseneck drawbar and formed with an angular bottom portion for engagement with the forward surface of the trailer in horizontal or inclined position; and a kingpin depending from the bearing plate member engageable with the trailer-carried fifth wheel.

5. In combination, a tractor having a fifth wheel and a rearwardly disposed inclined ramp leading thereto, a low bed trailer supported on wheels at its rear end, the forward end portion of the trailer carrying a fifth wheel plate and a forwardly projecting dowel, and a detachable gooseneck drawbar removably interposed between the rear end of the tractor and the front end of the trailer, the lower rear end portion of the gooseneck drawbar having pivotally mounted thereon for swinging movement in a vertical plane a hooking element to releasably engage the trailer-carried dowel, said lower rear end portion of the gooseneck drawbar also having pivotally mounted thereon on horizontal pivot members a bearing plate assemblage to engage the top surface of the trailer, there being a kingpin depending from the bearing plate assemblage for releasable engagement with the trailer-carried fifth wheel, the forward end portion of the drawbar being adjustable along the tractor ramp and releasably engageable with the tractor fifth wheel.

6. In a tractor-low bed trailer assemblage wherein the forward end portion of the trailer carries a fifth wheel, connecting means interposed therebetween comprising, a detachable gooseneck drawbar for removable connection with the tractor-carried fifth wheel, the front end portion of the low bed trailer being provided with a fifth wheel and a projecting member, a hook member swingably carried by the lower rear end portion of the gooseneck drawbar for releasable engagement with the trailer-carried projecting member, a bearing plate of angular form in cross-section vertically swingably carried by the lower rear end portion of the gooseneck drawbar for adjustable engagement with the forward top surface portion of the trailer in horizontal or inclined position; and a kingpin rigidly depended from the bearing plate for releasable engagement with the trailer-carried fifth wheel.

7. In combination, a tractor having a fifth wheel and a rearwardly disposed inclined ramp leading thereto, a low bed trailer supported on wheels at its rear end, the forward end portion of the trailer carrying a fifth wheel plate and a pair of forwardly projecting dowels, and a detachable gooseneck drawbar having a raised forward end portion and a down-turned rear end portion removably interposed between the rear end of the tractor and the front end of the trailer, the lower portion of the down-turned rear end of the gooseneck drawbar having pivotally mounted thereon for swinging movement in a vertical plane a pair of laterally spaced-apart stirrups to releasably engage the trailer-carried dowels, said lower rear end portion of the gooseneck drawbar also having pivotally mounted thereon on horizontal pivot members a bearing plate assemblage to adjustably engage the top surface of the trailer, there being a kingpin depending from the bearing plate assemblage for releasable engagement with the trailer-carried fifth wheel, the raised forward end portion of the drawbar being adjustable along the tractor ramp and releasably engageable with the tractor fifth wheel.

8. For a tractor and semi-trailer unit in which the trailer includes a first connecting means at its front and forming a part of a coupling means between the trailer and tractor: means for connecting the trailer to the tractor via the aforesaid first connecting means, comprising a drawbar having a first portion, a second portion, and swingably adjustable second connecting means on the second portion of the drawbar and connectable to the aforesaid first connecting means on the trailer; and means mounted on the tractor including a third connecting means and a rearwardly inclined ramp engageable with the first drawbar portion to raise or lower the same to raise or lower the second drawbar portion with respect to the aforesaid first and second connecting means between the trailer and drawbar.

9. A removable gooseneck for detachably connecting a tractor with a low bed heavy duty trailer, comprising a rigid drawbar having an elevated forwardly extending portion adapted for pivotal connection with the tractor and having a downwardly extending rear portion for rigid connection with the trailer, the downwardly extending rear portion of the drawbar pivotally carrying hooking members and also pivotally carrying on horizontal axes a bearing and coupling plate of angular form in cross-section.

10. The combination with a low bed trailer, the rear end of which is supported on wheels and the front end of which is adapted to be supported on a tractor, of a removable gooseneck adapted to be rigidly connected with the front end of the trailer, said gooseneck and trailer being provided with complementary interfitting coupling elements comprising a fifth wheel plate and forwardly projecting dowels on the trailer and swingable hooking members and a swingable kingpin-carrying angularly shaped bearing plate on the lower rear end portion of the gooseneck, said gooseneck being provided with releasable means co-operable with an element on the tractor for pivoting the gooseneck on the tractor for movement in a generally horizontal plane, and the tractor being provided with a rearwardly downwardly inclined surface which, upon release of said pivoting means, supports the forward end of the gooseneck on the tractor in a bodily lowered position to permit coupling or uncoupling of the gooseneck relative to the trailer with the front end of the trailer lowered for loading or unloading.

No references cited.